United States Patent
Sheets et al.

(10) Patent No.: US 9,613,377 B2
(45) Date of Patent: Apr. 4, 2017

(54) ACCOUNT PROVISIONING AUTHENTICATION

(71) Applicant: Visa International Service Association, San Francisco, CA (US)

(72) Inventors: John Sheets, San Francisco, CA (US); James McCarthy, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 463 days.

(21) Appl. No.: 14/216,537

(22) Filed: Mar. 17, 2014

(65) Prior Publication Data

US 2014/0279477 A1     Sep. 18, 2014

Related U.S. Application Data

(60) Provisional application No. 61/800,361, filed on Mar. 15, 2013.

(51) Int. Cl.
| | |
|---|---|
| G06Q 40/02 | (2012.01) |
| G06Q 20/32 | (2012.01) |
| G06Q 20/34 | (2012.01) |
| G06Q 20/36 | (2012.01) |
| G06Q 20/38 | (2012.01) |
| G06Q 20/40 | (2012.01) |
| G06Q 20/42 | (2012.01) |

(52) U.S. Cl.
CPC ......... *G06Q 40/02* (2013.01); *G06Q 20/3226* (2013.01); *G06Q 20/3227* (2013.01); *G06Q 20/3229* (2013.01); *G06Q 20/3274* (2013.01); *G06Q 20/3278* (2013.01); *G06Q 20/3552* (2013.01); *G06Q 20/363* (2013.01); *G06Q 20/388* (2013.01); *G06Q 20/4012* (2013.01); *G06Q 20/425* (2013.01)

(58) Field of Classification Search
None
See application file for complete search history.

(56) References Cited

U.S. PATENT DOCUMENTS

| | | | |
|---|---|---|---|
| 6,973,463 | B2 | 12/2005 | Merrells et al. |
| 7,707,120 | B2 | 4/2010 | Dominguez et al. |
| 8,271,395 | B2 | 9/2012 | Dominguez et al. |
| 9,282,098 | B1 | 3/2016 | Hitchcock et al. |
| 2008/0207203 | A1* | 8/2008 | Arthur ................ G06Q 20/322 455/435.1 |
| 2010/0312703 | A1 | 12/2010 | Kulpati et al. |

(Continued)

OTHER PUBLICATIONS

U.S. Appl. No. 14/455,600, filed Aug. 8, 2014 by Wong et al.

*Primary Examiner* — Kristy A Haupt
(74) *Attorney, Agent, or Firm* — Kilpatrick Townsend & Stockton LLP

(57) ABSTRACT

Embodiments of the present invention are directed to methods, systems, and apparatuses for providing a secure authentication scheme for authenticating users and accounts on behalf of a service provider server computer offering services to a user. Upon determining, by the secure authentication scheme, that the user and/or account identifier associated with the user is authenticate, the service provider server computer may be provided with assurance that the user is authenticate and thereafter provide a service requested by the user.

16 Claims, 10 Drawing Sheets

(56) References Cited

U.S. PATENT DOCUMENTS

2011/0196791 A1* 8/2011 Dominguez .......... G06Q 40/00
                                                   705/44
2012/0078735 A1    3/2012 Bauer et al.
2015/0046339 A1    2/2015 Wong et al.

* cited by examiner

ACCOUNT PROVISIONING AUTHENTICATION

CROSS-REFERENCES TO RELATED APPLICATIONS

This application claims the benefit of priority U.S. Provisional Application No. 61/800,361, filed Mar. 15, 2013, titled "ACCOUNT PROVISIONING AUTHENTICATION," which is incorporated by reference in its entirety for all purposes.

BACKGROUND

The uses and capabilities of mobile communication devices have rapidly increased in recent years, such as the ability to make payments. In effect, consumers are increasingly conducting transactions using mobile communication devices (e.g., smart phones and other portable devices), rather than with physical forms of tender (e.g., banknotes) with set monetary values.

Mobile wallets can typically be installed on the consumer's mobile communication device as a mobile application. Currently, when a consumer wants to have a payment device provisioned onto their mobile wallet, a mobile wallet application on the consumer's mobile communication device prompts the user to enter the details of the payment device (e.g., payment device number, expiration data, card verification number). If an unauthorized user gets hold of the consumer's payment device details, the unauthorized user may be able to provision a virtual copy of the payment device onto their phone and could conduct unauthorized transactions.

Embodiments of the present invention address the above problems and other problems.

BRIEF SUMMARY

Embodiments of the present invention relate in general to improved systems and methods for authenticating a user attempting to utilize services provided by a service provider server computer. For example, the user may have a wallet application stored in a memory of the user's mobile communication device and may want to have a new account or payment device provisioned on the user's mobile communication device for use with the wallet application. Embodiments of the present invention address the threat of fraud in such scenarios and improve the security of the wallet application and the user's account or payment device by providing secure and enhanced authentication services using authentication data for user enrolled in an authentication program.

One embodiment of the invention is directed to a method comprising receiving a service provider request message from a service provider server computer comprising an account identifier. The service provider request message being received at an access control server computer via a directory server. The method further comprises determining, by the access control server computer, that the account identifier is enrolled in an authentication program. In response to determining that the account identifier is enrolled in the authentication program, an authentication request message requesting authentication data is transmitted to a mobile communication device used by a user associated with the account identifier. The method further comprises receiving an authentication response message from the mobile communication device comprising the requested authentication data. When the access control server computer determines that the requested authentication data in the authentication response message matches authentication data stored in a database, the method further comprises initiating an action relating to the mobile communication device and the account identifier.

Another embodiment of invention is directed to a access server computer comprising a processor and a computer readable medium coupled to the processor, the computer readable medium comprising code, executable by the processor for implementing a method. The method comprises receiving a service provider request message from a service provider server computer comprising an account identifier. The service provider request message being received at the access control server computer via a directory server. The method further comprises determining, by the access control server computer, that the account identifier is enrolled in an authentication program. In response to determining that the account identifier is enrolled in the authentication program, an authentication request message requesting authentication data is transmitted to a mobile communication device used by a user associated with the account identifier. The method further comprises receiving an authentication response message from the mobile communication device comprising the requested authentication data. When the access control server computer determines that the requested authentication data in the authentication response message matches authentication data stored in a database, the method further comprises initiating an action relating to the mobile communication device and the account identifier.

Another embodiment of the invention is directed to a method comprising receiving, at a directory server, a service provider request message comprising an account identifier from a service provider server computer. The method further comprises determining an access control server computer associated with the account identifier and transmitting the service provider request message to the access control server computer. The method further comprises the computer receiving a service provider response message from the access control server computer, and transmitting the service provider response message to the service provider server computer. The service provider server computer or the access control server computer may then initiate an action relating to the account identifier and a mobile communication device used by a user associated with the account identifier.

Another embodiment of invention is directed to a computer comprising a processor and a computer readable medium coupled to the processor, the computer readable medium comprising code, executable by the processor for implementing a method. The method comprises receiving, at a directory server, a service provider request message comprising an account identifier from a service provider server computer. The method further comprises determining an access control server computer associated with the account identifier and transmitting the service provider request message to the access control server computer. The method further comprises the computer receiving a service provider response message from the access control server computer, and transmitting the service provider response message to the service provider server computer. The service provider server computer or the access control server computer may then initiate an action relating to the account identifier and a mobile communication device used by a user associated with the account identifier These and other embodiments of the invention are described in further detail below with reference to the Drawings and the Detailed Description.

DETAILED DESCRIPTION

Figure 1:
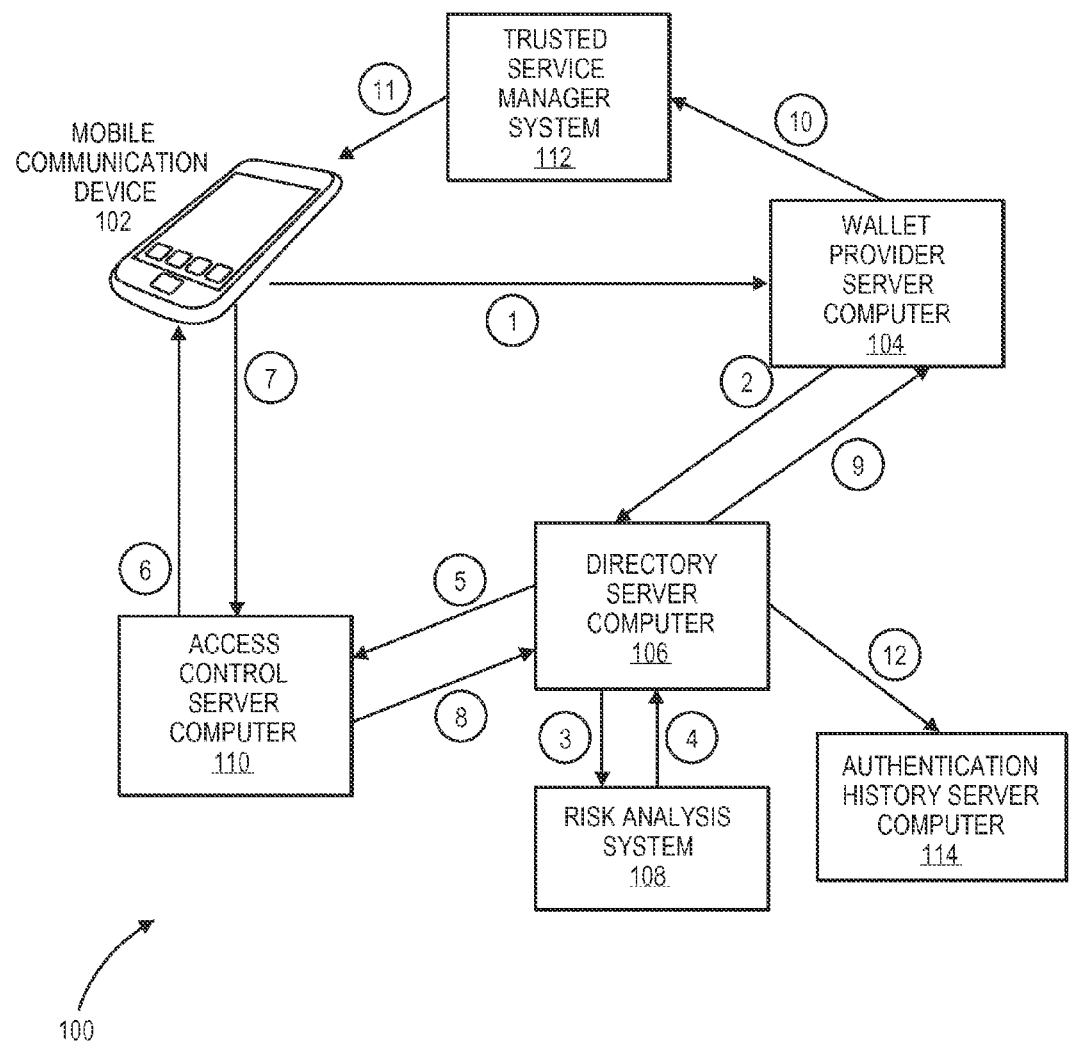
FIG. 1 shows a system diagram and flowchart for a system configured to process service provider requests and perform a secure authentication of an account identifier according to an embodiment of the present invention.

Prior to discussing embodiments of the invention, descriptions of some terms may be helpful in providing a better understanding of the invention.

A "mobile communication device" may include a device which can be used to communicate with another device or system. It can include a consumer or user device that is used to conduct a transaction such as a transfer of funds. The mobile communication device may be capable of conducting communications over a network. A mobile communication device may be in any suitable form. For example, suitable mobile communication devices can be hand-held and compact so that it can fit into a user's wallet and/or pocket (e.g., pocket-sized). The mobile communication device can include a processor, and memory, input devices, and output devices, operatively coupled to the processor. Specific examples of mobile communication devices include cellular or mobile phones, tablet computers personal digital assistants (PDAs), pagers, portable computers, smart cards, and the like. The mobile communication device may also be referred to as a mobile device or a consumer mobile device.

An "authentication program" may include a module that can perform authentication according to a specific set of rules. An authentication program may include processes related to authenticating an account identifier, a user, or a payment device.

"Authentication data" may include data used to authenticate a user. Authentication data may include may include, but is not limited to, an account number, a user's date of birth, a user's password, a user's social security number, or other unique data.

An "authentication request message" may include a message sent as part of an authentication process. The authentication request message may request authentication data from a user.

An "authentication response message" may include a message sent as part of an authentication process in response to an authentication request message. An authentication response message may include authentication data provided by a user or consumer.

The term "message" may refer to any data or information that may be transported from one entity to another (e.g., from one computer or computing device to another computer or computing device). Further, a message may include a single signal or data packet or a combination of multiple transporting signals. For example, a message may include an analog electrical signal or digital signal that constitutes binary information that may be interpreted as communicating information. Additionally, a message may comprise any number of pieces of information including both private and/or public information. Messages may be communicated internally between devices within a secure organization or externally between a device within a secure organization or network to a device outside of a secure organization, area, or communication network. Additionally, whether information contained within a message is considered public or private may be dependent on who the secure organization or area originating the message is, who the message is being sent to (e.g., recipient computer or requesting computer), or in any other suitable manner. Additionally, messages may be modified, altered, or otherwise changed to comprise encrypted or anonymized information.

The term "user" may refer to an individual or entity. The user may be a consumer or business that is associated with a financial account and whose financial account can be used to conduct financial transactions using a payment device associated with the financial account.

The term "account identifier" may refer to any information that may be used to identify an account. For example, the account identifier may be an account number associated with a financial account (e.g., a credit card number or debit card number), or may be a special identifier generated randomly or according to a predetermined algorithm, code, or shared secret. The account identifier may also include user (or consumer data). The account identifier for a financial account may be generated by an issuer associated with the financial account. The account identifier may also be embedded in a payment device, such as in a magnetic stripe portion or a contact/contactless chip of a payment device in the form of a payment card. In other embodiments, the account identifier may be stored in a memory component of a mobile communication device for identifying the financial account associated with the account identifier. In some embodiments, the account identifier may include a series of alphanumeric characters, one or more graphics, a token, a bar code, a QR code, or any other information that may be associated with an account.

"Provisioning" may include a process of granting the ability to use a resource or service. In embodiments of the present invention, provisioning can include adding data to a mobile communication device.

The term "initiating" may include the first steps taken in order to begin a process or the steps conducted in order to complete a process. For example, "initiating an action relating to the mobile communication device and the account identifier" can refer to the actual process required to complete the action relating to the mobile communication device and the account identifier. However, "initiating an action relating to the mobile communication device and the account identifier" can also refer to the process of sending a message from the server computer to the payment processing network, or from the payment processing network to the issuer computers, with instructions for performing the process required to complete the action relating to the mobile communication device and the account identifier.

In some embodiments of the present invention, the "action" may include provisioning an account identifier (e.g., a payment device) onto a mobile wallet stored on the mobile communication device. In other embodiments, the "action" may be cloning the mobile wallet from a first mobile communication device to a second mobile communication device, adding additional users as being authorized to use the mobile wallet, remote wiping of the mobile wallet (e.g., when the mobile communication device is lost or stolen).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "database" may include any hardware, software, firmware, or combination of the preceding for storing and facilitating the retrieval of information. Also, the database may use any of a variety of data structures, arrangements, and compilations to store and facilitate the retrieval of information.

An "issuer computer" may include an entity that issues an account. An issuer is typically a business entity (e.g. a bank) which maintains financial accounts for a plurality of users (e.g., consumers).

A "risk score" may include results of a risk analysis or evaluation. A risk score may be in the form of an alphanumeric value such as a number from 1-10 or a letter from A-Z.

A "service provider" may include any suitable entity that provides a service. An exemplary service provider may be a wallet provider that provides digital wallet services, a merchant, etc.

An "access control server computer" may be a computer or system that is configured to provide authentication and/or verification services.

A "directory server computer" may include a server that can perform message routing. In some embodiments, the director server is capable of receiving messages (e.g., service provider request messages), determine the appropriate destination for the received messages, and route the received messages to the appropriate destination. In some embodiments, the directory server may include or be associated with a database containing routing tables that may be used to determine an appropriate issuer associated with an account identifier.

I. Exemplary System

A system 100 configured to process service provider requests and perform a secure authentication of an account identifier according to an embodiment of the present invention is shown with reference to FIG. 1.

For simplicity of illustration, a certain number of components are shown in FIG. 1. It is understood, however, that embodiments of the invention may include more than one of each component. In addition, some embodiments of the invention may include fewer than all of the components shown in FIG. 1. In addition, the components in FIG. 1 may communicate via any suitable communication medium (including the Internet), using any suitable communications protocol.

The system 100 may include a mobile communication device 102, a wallet provider server computer 104, a directory server computer 106, a risk analysis system 108, an access control server computer 110, a trusted service manager system 112, and an authentication history server computer 114. Each of these systems and computers may be in operative communication with each other.

The directory server computer 106 may interact with the risk analysis system 108 to request and obtain risk scores, and it may also interact with the authentication history server computer 114 to store the authentication histories associated with a number of events. The directory server computer 106 may also route messages between the access control server computer 110 and a service provider server computer such as the wallet provider server computer 104.

The trusted service manager system 112 may interact with the wallet provider server computer 104 and the access control server computer 110 in order to provide data to the mobile communication device 102. Further details regarding the operation of the components in FIG. 1 are provided below.

Figure 2:
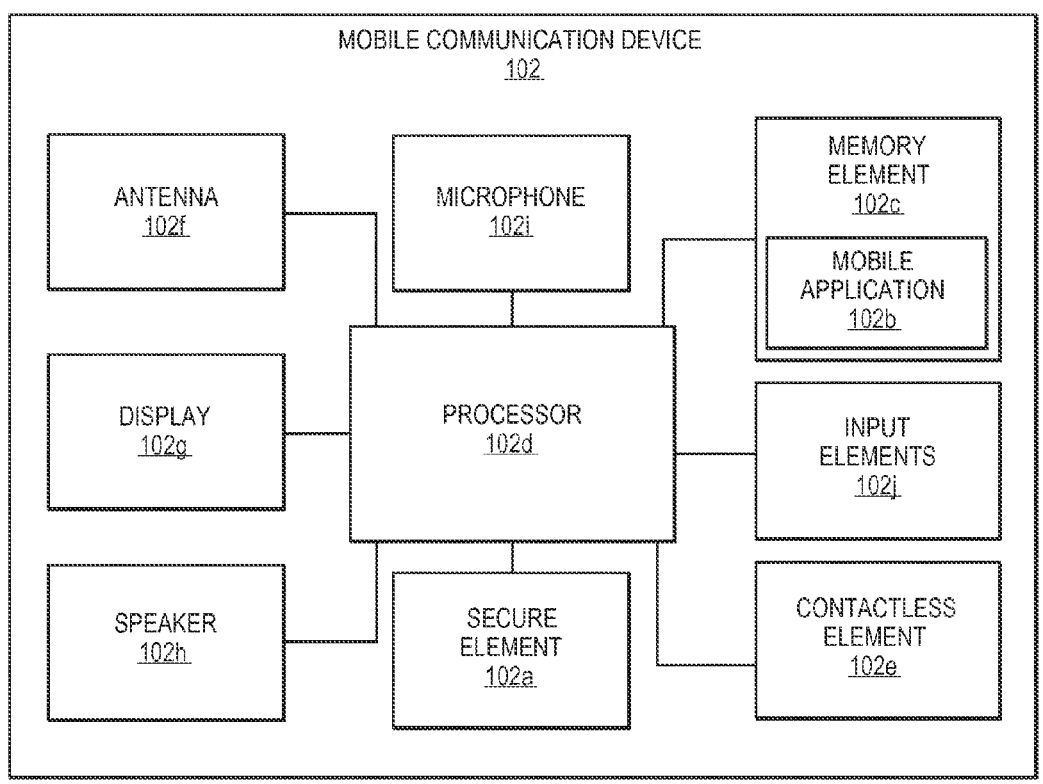
FIG. 2 depicts an exemplary block diagram of a mobile communication device according to an embodiment of the present invention.

FIG. 2 depicts a block diagram of an exemplary mobile communication device 102. FIG. 2 shows a number of components, and the mobile communication devices 102 according to embodiments of the invention may comprise any suitable combination or subset of such components. The mobile communication device 102 may comprise a memory element 102*c* (e.g., computer readable medium) as shown in FIG. 2. The memory element 102*c* may be present within a body of the mobile communication device 102 or may be detachable from it. The body of the mobile communication device 102 may be in the form a plastic substrate, housing, or other structure. The memory element 102*c* may be a memory that stores data and may be in any suitable form including a magnetic stripe, a memory chip, uniquely derived keys (such as those described above), encryption algorithms, etc.

The memory element 102*c* may comprise a mobile application 102*b*. The mobile application 102*b* may be computer code or other data stored on a computer readable medium (e.g. memory element 102*c* or secure element 102*a*) that may be executable by the processor 102*d* to complete a task. The mobile application 102*b* may be an application that operates on the mobile communication device 102 that provides a user interface for user interaction (e.g., to enter and view information).

The mobile application 102*b* may communicate with the wallet provider server computer to retrieve and return information during the processing of any of a number of services offered to the user via the mobile communication device 102 (e.g., provisioning accounts to a wallet application stored on the mobile communication device 102).

The secure element 102*a* may be a secure memory on the mobile communication device 110 such that the data contained on the secure element 102*a* cannot easily be hacked, cracked, or obtained by an unauthorized entity. The secure element 102a may be used by the mobile communication device 102 to host and store data and applications that may require a high degree of security. The secure element 102a may be provided to the mobile communication device 110 by a secure element issuer. The secure element 102a may be either embedded in the handset of the mobile communication device 102 or in a subscriber identity module (SIM) card that may be removable from the mobile communication device 102. The secure element 102a can also be included in an add-on device such as a micro-Secure Digital (micro-SD) card or other portable storage device.

The secure element 102a may store the same information such as financial information, bank account information, credit, debit, or prepaid account number information (or payment tokens associated with such credit, debit, or prepaid account numbers), account balance information, expiration dates, verification values such as CVVs or dCVVs, etc. Other information that may be stored in the secure element 102a may include consumer information such as name, date of birth, etc. In other embodiments, some, none or all of the foregoing information may be stored in the memory element 102c or may be stored at a remote server computer (e.g., in the cloud at the wallet provider server computer 104).

The mobile communication device 102 may further include a contactless element 102e, which may typically be implemented in the form of a semiconductor chip (or other data storage element) with an associated wireless transfer (e.g., data transmission) element, such as an antenna. Contactless element 102e may be associated with (e.g., embedded within) the mobile communication device 102 and data or control instructions transmitted via a cellular network may be applied to contactless element 102e by means of a contactless element interface (not shown). The contactless element interface may function to permit the exchange of data and/or control instructions between the mobile communication device circuitry (and hence the cellular network) and an optional contactless element 102e.

The contactless element 102e is capable of transferring and receiving data using a near-field communications (NFC) capability (or NFC medium) typically in accordance with a standardized protocol or data transfer mechanism (e.g., ISO 14443/NFC). Mobile communication devices 102 that support mobile contactless payments typically support contactless transactions using the EMV contactless communication protocol (EMV-CCP), which is based on ISO 14443, in order to interact with merchant access devices. This capability may typically met by implementing NFC. The NFC capability on the mobile communication device 110 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the mobile communication device 102 and an interrogation device. Thus, the mobile communication device 102 may be capable of communicating and transferring data and/or control instructions via both cellular network and near-field communications capability.

The mobile communication device 102 may also include a processor 102d (e.g., a microprocessor) for processing the functions of the mobile communication device 102 and a display 102g to allow a consumer to see phone numbers and other information and messages. The mobile communication device 102 may further include input elements 102j to allow a consumer to input information into the device, a speaker 102h to allow the consumer to hear voice communications, and a microphone 102i to allow the user to transmit his or her voice through the mobile communication device 102. The mobile communication device 102 may also include an antenna 102f for wireless data transfer (e.g., data transmission).

In some embodiments, the display 102g of the mobile device 102 may also be a user interface that may allow the user to select or interact with objects presented on the display 102g, including, but not limited to menus, text fields, icons, and keys/inputs on a virtual keyboard. The display 102g may be configured to present an application (e.g., a wallet application), as shown in FIGS. 7A-7B and 8A-8C.

The wallet provider server computer 104 may include a processor and a computer readable medium coupled to the processor, the computer readable medium comprising code, executable by the processor for performing the functionality described below.

The wallet provider server computer 104 may manage and provide services to a user. In some embodiments, the services may be provided to the user via a mobile application associated with the wallet provider server computer 104 and stored on a user's mobile communication device 102. The wallet provider server computer 104 may send and receive over-the-air (OTA) messages to the mobile application stored on the user's mobile communication device 102.

In some embodiments, the wallet provider server computer 104 may receive a request from the user, via the mobile application, to provision an account on to the mobile communication device 102. In such embodiments, the wallet provider server computer 104 may be configured to generate a service provider request message as part of an authentication process to authenticate the user or an account identifier associated with the account. The wallet provider server computer 104 may be further configured to receive a service provider response message indicating the result of the authentication process. In such embodiments, when the authentication process is successful, the wallet provider server computer 104 may be configured to send an activation request message to a trusted service manager system 112 requesting the trusted service manager system 112 to provision the account on to a secure element 102a or to a memory element 102c associated with the mobile communication device 102.

In some embodiments of the present invention, the wallet provider server computer 104 may be an example of a service provider server computer. A service provider server computer may provide services to a user and a mobile communication device 102, other than or in addition to, wallet-related services.

The directory server computer 106 may include a computer that is used for message routing and/or data computation. In some embodiments, the directory server computer 106 is capable of receiving messages (e.g., service provider request messages, verify enrollment request messages, and other transaction-related messages), determine the appropriate destination for the received messages, and route the received messages to the appropriate destination. For example, the directory server computer 106 may receive a service provider request message, determine the appropriate issuer associated with an account identifier included in the service provider request message, and then route the service provider request message to the appropriate issuer. In some embodiments, the directory server computer 106 may further route the service provider request message to a risk analysis system 108 so that the risk analysis system 108 can determine a risk score. In some embodiments, the directory server computer 106 may include or be associated with a database containing routing tables that may be used to determine the appropriate issuer associated with the account identifier in the service provider request message. In some embodiments, the directory server computer 106 may be operated by a payment processing network, and may be further configured to route messages related to financial transactions. The payment processing network (not shown) may be situated between an issuer, and an acquirer and a merchant. The payment processing network may further be configured to process credit and debit card transactions.

Figure 3:
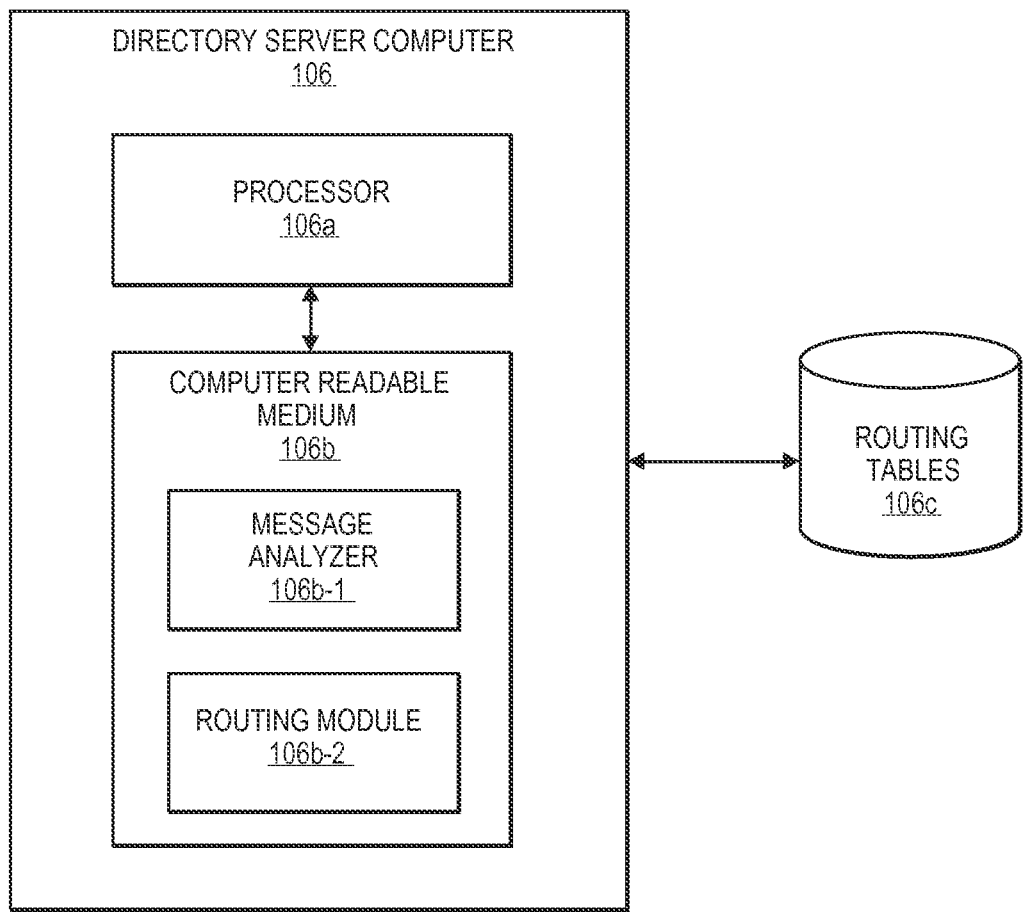
FIG. 3 depicts an exemplary block diagram of a directory server according to an embodiment of the present invention.

FIG. 3 depicts an exemplary block diagram of a directory server computer 106 according to an embodiment of the present invention. The directory server computer 106 depicted in FIG. 3 shows a number of components, and the directory server computer 106 according to embodiments of the invention may comprise any suitable combination or subset of such components. In some embodiments, the directory server computer 106 may include greater than or less than the components depicted in FIG. 3. The directory server computer 106 may include a processor 106a and a computer readable medium 106b coupled to the processor 106a, the computer readable medium 106b comprising code, executable by the processor 106a for performing the functionality described herein. The computer readable medium 106b may store code for a message analyzer module 106b-1 and a routing module 106b-2. Further details of the message analyzer module 106b-1 and a routing module 106b-2 are described with respect to FIGS. 1 and 6 below.

The risk analysis system 108 may be a system that is configured to receive data and perform a risk analysis. In some embodiments, the risk analysis system 108 receives messages from the directory server computer 106, and attempts to generate a risk score associated with a query contained in the message from the directory server computer 106. The risk analysis system 108 may then transmit the determined risk score back to the directory server computer 106.

The access control server computer 110 may include a processor and a computer readable medium coupled to the processor, the computer readable medium comprising code, executable by the processor for performing the functionality described below. The access control server computer 110 may be a computer or system that is configured to provide authentication and verification services. In some embodiments, the access control server computer 110 may store enrollment data for enrolled users and account identifiers. The enrollment data may be used to indicate enrollment of users and account identifiers in an authentication program.

In some embodiments, the access control server computer 110 may be configured to initiate a process to authenticate a user when it receives a service provider request message. The access control server computer 100 may then transmit an authentication request message to the user requesting authentication data. The authentication request message may be transmitted to a mobile communication device 102 associated with the user. The access control server computer 110 may then receive authentication data from the user in an authentication response message. The received authentication data may then be compared with stored authentication data. In some embodiments of the present invention, when the received authentication data and the stored authentication data match, the user or account identifier may be considered authenticated and the access control server computer 110 may generate a service provider response message indicating authentication. The access control server computer 110 may direct the service provider response message back to the appropriate service provider computer (e.g., the wallet provider server computer 104).

In some embodiments, the access control server computer 110 may be an issuer access control server computer operated and managed by an issuer of the account identifier. In other embodiments, the access control server computer 110 may be operated by a payment processor on behalf of an issuer.

Figure 4:
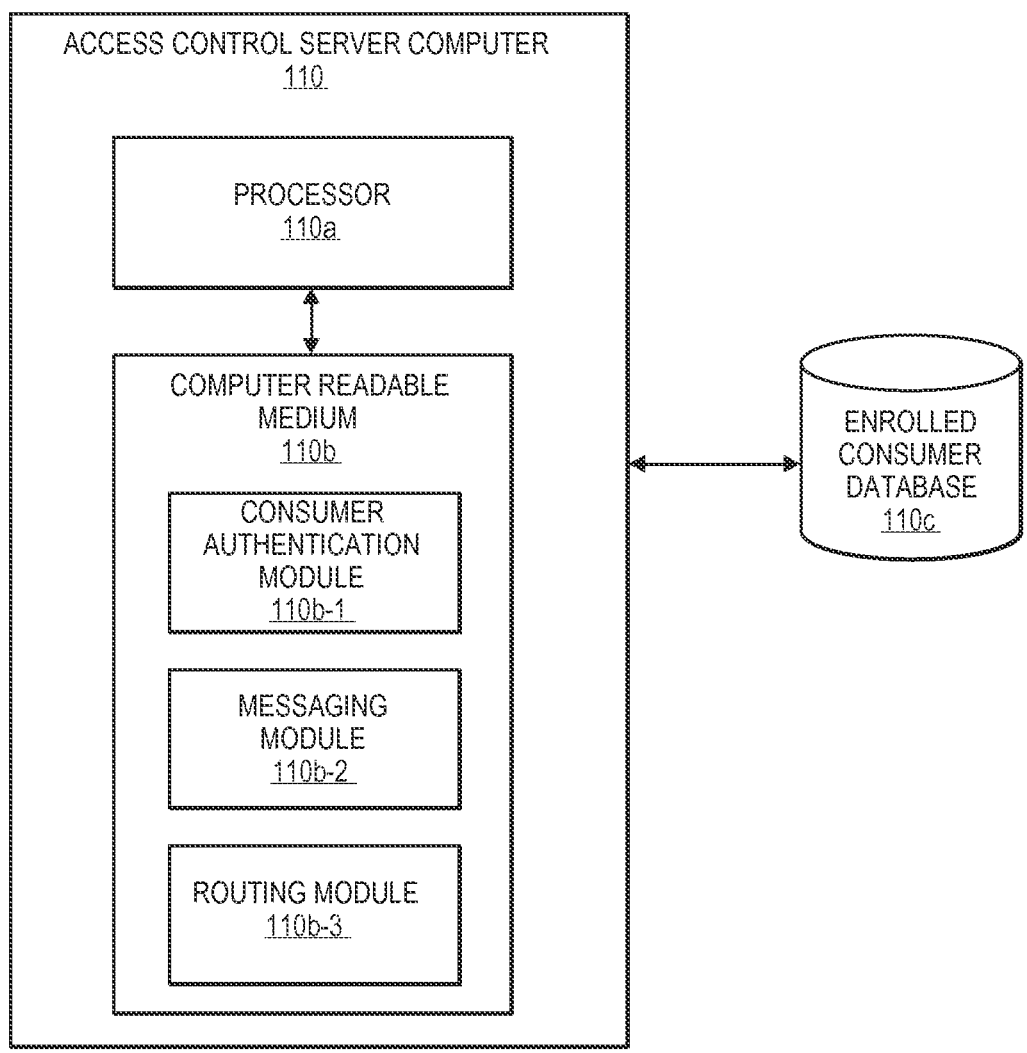
FIG. 4 depicts an exemplary block diagram of an access control server computer according to an embodiment of the present invention.

FIG. 4 depicts an exemplary block diagram of an access control server computer 110 according to an embodiment of the present invention. The access control server computer 110 depicted in FIG. 4 shows a number of components, and the access control server computer 110 according to embodiments of the invention may comprise any suitable combination or subset of such components. In some embodiments, the access control server computer 110 may include greater than or less than the components depicted in FIG. 4. The access control server computer 110 may include a processor 110a and a computer readable medium 110b coupled to the processor 110a, the computer readable medium 110b comprising code, executable by the processor 110a for performing the functionality described herein. The computer readable medium 110b may store code for a consumer authentication module 110b-1, a messaging module 110b-2, and a routing module 106b-3. Further details of the message analyzer module 106b-1 and a routing module 106b-2 are described with respect to FIGS. 1 and 5 below.

The trusted service manager system 112 may be a computer or system that offers services to support mobile financial services. For example, in some embodiments, the trusted service manager system 112 may provision data on the secure element using over-the-air communications. In some embodiments, upon successful authentication by an access control server computer 110, the trusted service manager system 112 may receive an activation request from a wallet provider server computer 104 directing the trusted service manager system 112 to provision an account to the secure element of a mobile communication device 102 for use with a wallet application. The trusted service manager system 112 may also lock or unlock the secure element 102a on the mobile communication device 102. Additionally, the trusted service manager system 112 may provide ongoing secure element platform management and support.

The authentication history server computer 114 may be a database or computer system in communication with the directory server computer 106. In some embodiments, the authentication history server computer 114 may be in communication with the access control server computer 110. The authentication history server computer 114 may be accessed as part of an authentication process. For example, the authentication history server computer 114 may store user authentication data associated with account identifiers (e.g., credit card numbers, debit card numbers, personal account numbers (PANs)).

I. Exemplary Methods

Methods according to embodiments of the invention can be described with respect to FIGS. 1-8C.

FIG. 1 shows a flow diagram for a system configured to process service provider requests and perform a secure authentication of an account identifier according to an embodiment of the present invention.

In step 1, a user access a wallet application stored on the user's mobile communication device 102. The wallet application may be computer code or other data stored on a computer readable medium (e.g. memory element or secure element) that may be executable by a processor to complete a task. The wallet application may provide a user interface for user interaction (e.g., to enter and view account information, send payments). The wallet application may communicate with a wallet provider server computer 104 to retrieve and return information during the processing of services offered to the user via the mobile communication device 102 (e.g., provisioning new accounts, sending mobile payments). Additionally, the wallet application can communicate with the wallet provider server computer 104 to send and receive over-the-air (OTA) messages. The mobile wallet application may be installed in a secure element within the mobile communication device 102. The mobile wallet application may provider the functionality to manage and maintain the user payment information and support mobile payments.

Figure 7A:
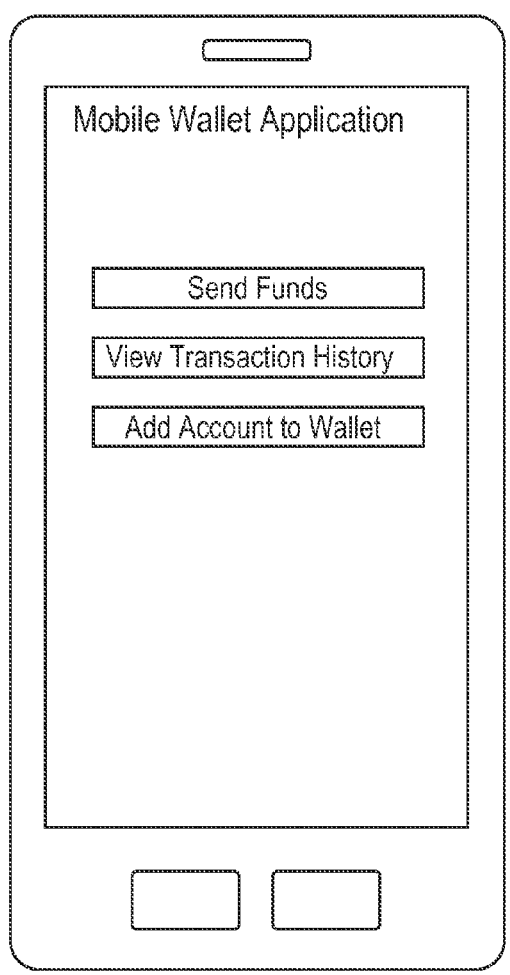
FIG. 7A-7B show a depiction of initiating the process of adding an account to a mobile wallet according to an embodiment of the invention.
Figure 7B:
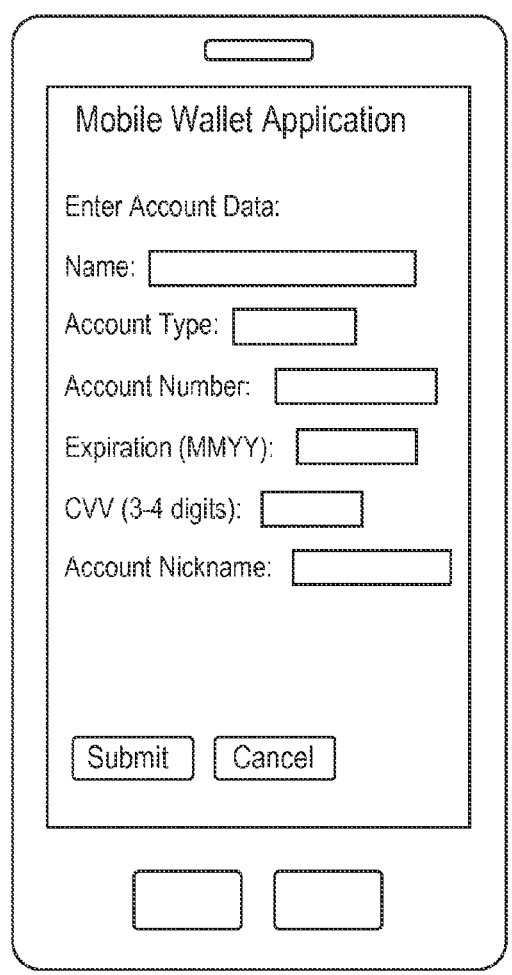

In embodiments of the present invention, the user may access the wallet application by selecting an icon or other text/visual graphic on the user's mobile communication device 102. Once the wallet application has been initiated, the user may be presented with a set of options and services provided by the wallet application. For example, as depicted in FIG. 7A, the user may be provided with the option to "Send Funds," "View Transaction History", and "Add Account to Wallet." In some embodiments, when the user selects the option "Add Account to Wallet," the user may be presented with a screen as depicted in FIG. 7B. In FIG. 7B, the user is prompted to provide the account details for the account that the user wants to add to their wallet application. In the case of a payment device (e.g., credit card, debit card), examples of account details that may be requested includes the name on the account, an account type, an account number, an expiration date for the payment device, and a card verification value associated with the payment device. In other embodiments, where the user wants to add a checking or savings account, the user may be prompted to provide a bank account number and a bank routing number.

In embodiments of the present invention, when the user submits the account details, the wallet application may transmit the account details to the wallet provider server computer 104. The account details may be transmitted over-the-air (OTA) across a mobile or cellular network.

In step 2, the wallet provider server computer 104 receives the account details from the mobile communication device 102, and then generates a service provider request message comprising the account details. The service provider request message may also contain user data identifying the user of the mobile communication device 102. In some embodiments, the service provider request message is a verify enrollment request message that is sent to verify that an account identifier is enrolled in an authentication program. The account identifier may be the credit card number, debit card number, or another account detail provider by the user. The wallet provider server computer 104 may then send the service provider request message to a directory server computer 106.

In step 3, the directory server computer 106 queries a risk analysis system 108 to determine a risk score associated with the account identifier. The account identifier included in the service provider request message may be sent to the risk analysis system 108 by the routing module 106b-2 stored in the computer readable medium 106b of the directory server computer 106.

In some embodiments, the risk analysis on the account identifier is not performed. In such embodiments, the directory server computer 106 may transmit the service provider request message to the access control server computer 110, as described with respect to step 5 below.

In step 4, the risk analysis system 108 returns the risk score to the directory server computer 106. In some embodiments, the risk analysis system 108 may be able to make risk assessments regarding the account identifier by evaluating past transaction data and past interaction data involving the account identifier. The risk analysis system 108 may use internal and external sources for determining the risk score associated with the account identifier. The risk score may be a numerical value or may be another type of indicator capable of expressing the risk associated with the account identifier. In some embodiments, the directory server computer 106, the risk score may be included with the service provider request message prior to being sent to the access control server computer 110. In such embodiments, the service provider request message may be amended to include the risk score in an unused field of the service provider request message, or the risk score may be sent as a separate message from service provider request message.

In step 5, the directory server computer 106 transmits the service provider request message to the access control server computer 110. For example, the account identifier may be used to locate an appropriate access control server computer 110 that the service provider request message should be transmitted to. When the directory server computer 106 has the routing data for the appropriate access control server computer 110, the routing module 106b-2 may be configured to route the service provider request message to the appropriate access control server computer 110. In embodiments of the present invention, this process may be performed prior to, concurrently with, or following the risk analysis.

Figure 8A:
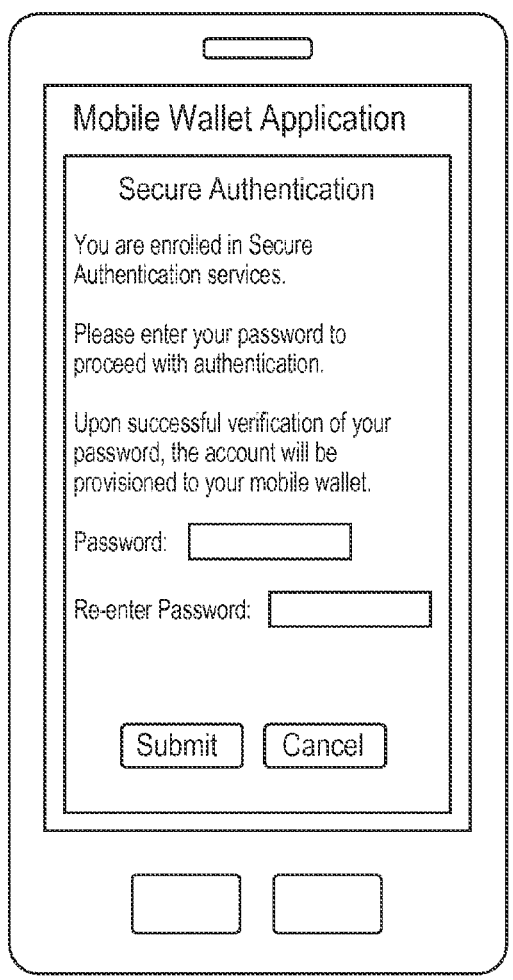
FIG. 8A-8C show a depiction of the process of adding an account to a mobile wallet according to an embodiment of the invention.

In step 6, the access control server computer 110 may generate and transmit an authentication request message to the mobile communication device 102. In some embodiments of the present invention, when the access control server computer 110 receives the service provider request message, the access control server computer 110 may determine whether the account identifier associated with the service provider request message is enrolled in the authentication program. The authentication request message may be in the form of an SMS message, an e-mail, an iFrame, a pop up window, etc. If the account identifier is enrolled in the authentication program, the authentication request message may be sent to the user's mobile communication device 102 requesting that the user provide a response to a challenge question or password request. In some embodiments, when the account identifier is enrolled, the user may be presented with a screen on their mobile communication device 102 as depicted in FIG. 8A requesting that the user provide a password associated with the enrolled account identifier.

In step 7, the mobile communication device 102 sends an authentication response message back to the access control server computer 110. The authentication response message may contain a response to the request for authentication data sent by the access control server computer 110 in the authentication request message. For example, the authentication response message may include a password, passphrase, or some other unique piece of authentication data. In embodiments of the present invention, the password may have been previously created by the user when the user enrolled in the authentication program. The authentication data received in the authentication response message may be compared with authentication data stored at the access control server computer 110 to determine a result of the authentication process. If the received authentication data and the stored authentication data match, the user may be considered authenticated; if they do not match, the user may be considered not authenticated.

In step 8, the access control server computer 110 generates and transmits a service provider response message to the directory server computer 106. The service provider response message may include the result of the authentication process indicating whether the account identifier was authenticated.

In step 9, the directory server computer 106 sends the service provider response message to the wallet provider server computer 104. In some embodiments, the directory server computer 106 routes the service provider response message to the wallet provider server computer 104 through any appropriate communications means.

In step 10, upon determining that the authentication process was successful, the wallet provider server computer 104 may then generate and send an activation request message to a trusted service manager system 112. The activation request message may be to provision the requested account on to the mobile communication device 102

In step 11, the trusted server manager system 112 may provision the account on the mobile communication device 102. In some embodiments, the account may be provisioned onto a secure element 102a associated with the mobile communication device 102 and accessible by the wallet application 102b stored in a memory element 102c of the mobile communication device 102. A secure link may be formed between the trusted service manager system 112 and the mobile communication device 102 so that data can be provided to the mobile communication device 102. A secure data channel and/or encryption may be used to ensure that data is securely transmitted to the mobile communication device 102.

The secure element 102a may be a secure memory device such that the data contained on the secure element 102a cannot easily be hacked, cracked, or obtained by an unauthorized entity. For example, the secure element 102a may be an integrated circuit device that is implemented within a mobile communication device 102. The secure element 102a may contain embedded smart card-grade applications (e.g., payment, transport, etc.). The secure element 102a may be used by the mobile communication device 102 to host and store data and applications that require a high degree of security. The secure element 102a may be provided to the mobile communication device 102 by a secure element issuer. Additionally, the secure element 102a may be either embedded in the handset of the mobile communication device 102 or in a subscriber identity module (SIM) card that may be removable from the mobile communication device 102. The secure element can also be included in an add-on device such as a micro-Secure Digital (microSD) card or other removable memory device.

Figure 8B:
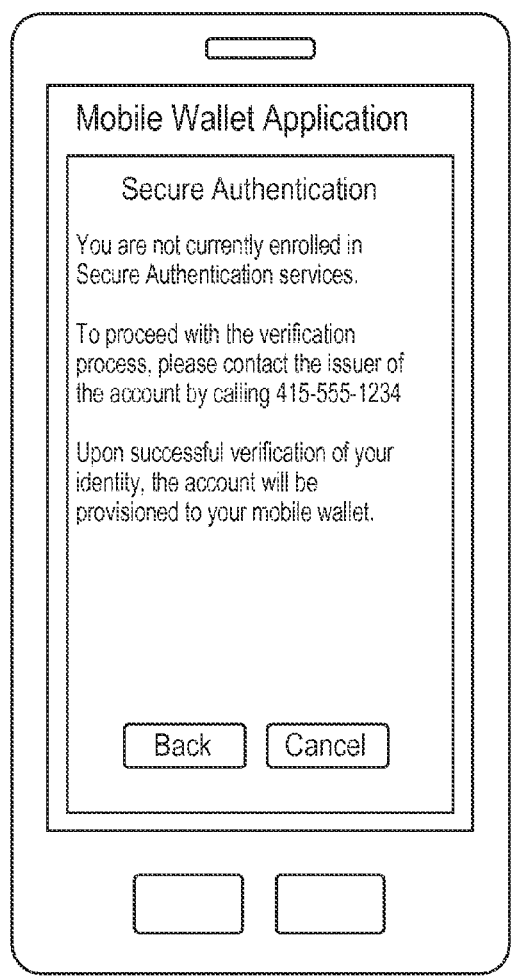
Figure 8C:
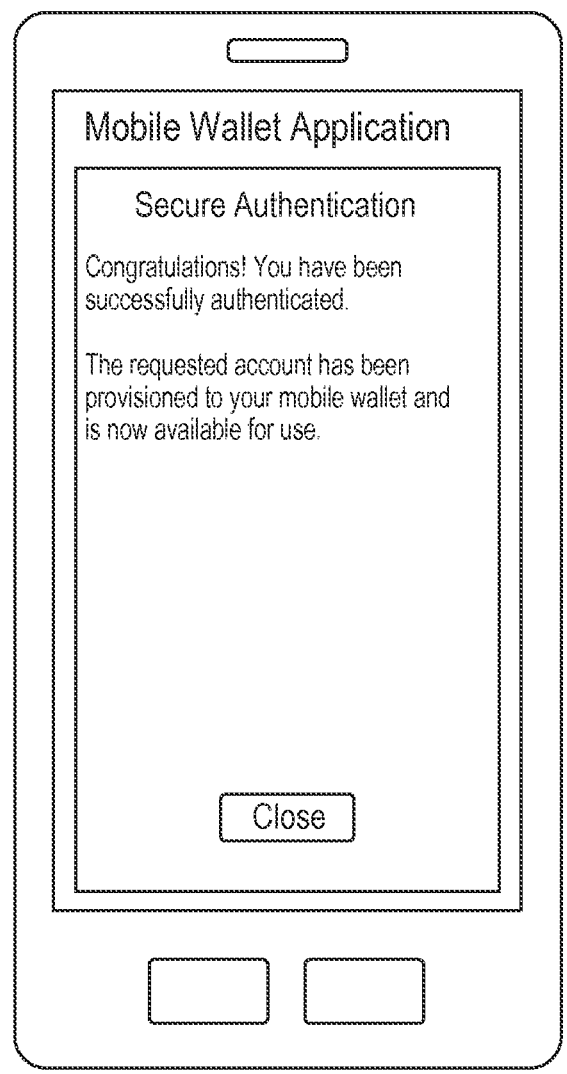

Upon successful completion of the provisioning, the user may be presented with a confirmation screen on their mobile communication device 102, as depicted in FIG. 8C.

In step 12, the directory server computer 106 may store details of the completed authentication process in the authentication history server computer 114. In some embodiments of the present invention, previous authentication processes involving the account identifier may be accessed via the authentication history server computer 114.

Figure 5:
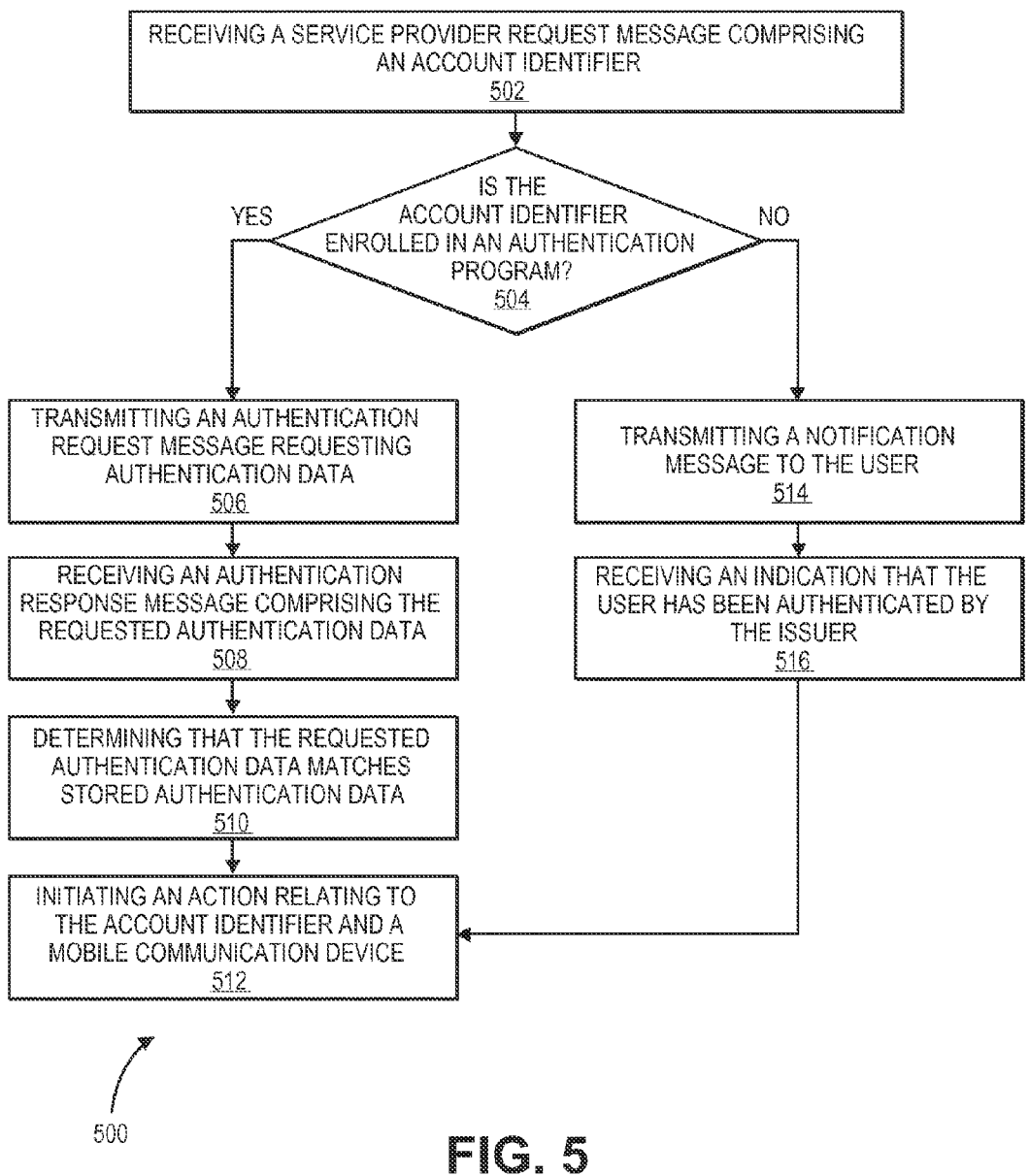
FIG. 5 is a detailed flowchart describing a method of performing an authentication of a user and provisioning an account on a mobile wallet using a secure authentication service according to an embodiment of the present invention.

FIG. 5 is a detailed flowchart describing a method of performing an authentication of a user and provisioning an account on a mobile wallet using a secure authentication service according to an embodiment of the present invention. FIG. 5 describes in additional detail the process performed by the access control server computer 110, as previously described with respect to the FIG. 1.

In step 502, the access control server computer 110 receives a service provider request message comprising an account identifier. The service provider request message may be received from a wallet provider server computer 104 (or other service provider server computer) via a directory server computer 106. The service provider request message may include user data and account data, including an account identifier.

In step 504, the access control server computer 110 determines whether the account identifier is enrolled in an authentication program. When the access control server computer 110 receives the service provider request message, the access control server computer 110 may first determine whether the account identifier associated with the service provider request message has been enrolled in the authentication program. In some embodiments, the access control server computer 110 may query an enrolled consumer database 110c that may store information for enrolled user accounts and user data. For example, an entry in the enrolled consumer database 110c may include the enrolled account identifier, user contact data, user mobile communication device data, and user authentication data (e.g., a password, pass phrase or unique code).

When the access control server computer 110 determines that the account identifier is enrolled in the authentication program, the process proceeds to step 506. When the access control server computer 110 determines that the account identifier is not enrolled in the authentication program, the process proceeds to step 514.

In step 506, the access control server computer 110 transmits an authentication request message to the mobile communication device 102 requesting authentication data. In some embodiments, when the access control server computer 110 determines that the account identifier is associated with an account enrolled in the authentication program, the consumer authentication module 110b-1 may direct the messaging module 110b-2 to generate an authentication request message requesting that the user provide their user authentication data. The authentication request message may then be transmitted to the user's mobile communication device 102 by the routing module 110b-3.

The authentication data may include a password created by the user as part of an enrollment process for the authentication program. In other embodiments, the password could be created by a payment processing network, or by an issuer computer, on behalf of the user. The password may be alphanumeric, or composed of only numbers or only letters. Passwords are not limited to strings of characters. Other examples of authentication data may include a personal identification number (PIN), a unique visual image or pattern, a voice pattern, or another unique configuration of letters and/or numbers.

In step 508, the access control server computer 110 receives an authentication response message comprising the requested authentication data. The access control server computer 110 may then receive an authentication response message including received user authentication data. The authentication response message may be received from the mobile communication device 102 by the routing module 110b-3

In step 510, the access control server computer 110 determines that the requested authentication data matches stored authentication data. The consumer authentication module 110b-1 may compare the received user authentication data with the stored user authentication data in the enrolled consumer database 110c. In some embodiments, the received authentication data may be required to exactly match the stored user authentication data. In other embodiments, authentication may be determined based on the received authentication data being within a predefined range of the stored user authentication data.

In step 512, the access control server computer 110 initiates an action relating to the mobile communication device 102 and the account identifier. In some embodiments, the access control server computer initiates the process of provisioning of the account identifier on to the mobile communication device 102. In such embodiments, based on the result of the comparison, the access control server computer 110 may then generate a service provider response message indicating the result of the authentication process. If the access control server computer 110 determined that the received user authentication data with the stored user authentication data matched, the account identifier may be considered authenticated and the service can be provided (e.g., provisioning the account on to the user's mobile communication device 102). If the access control server computer 110 determined that the received user authentication data with the stored user authentication data did not match, the account identifier may be considered not authenticated. The routing module 110b-3 may then route the service provider response message back to the appropriate destination (e.g., the service provider server computer or wallet provider server computer). Upon successful completion of the provisioning, the user may be presented with a confirmation screen on their mobile communication device 102, as depicted in FIG. 8C.

In step 514, if the user is not enrolled in the authentication program 504, the access control server computer 110 transmits a notification message to the user. In some embodiments, when the access control server computer 110 determines that the account identifier is not enrolled in the authentication program, the access control server computer 110 may direct the messaging module 110b-2 to generate a notification message to be sent to the mobile communication device 102. The notification message may provide a message to the user that they are not enrolled in the authentication program and that in order to be authenticated, they may contact the issuer associated with the account identifier. In some embodiments, when the account identifier is not enrolled, the user may be presented with a screen on their mobile communication device 102 as depicted in FIG. 8B.

In step 516, the access control server computer 110 receives an indication that the user has been authenticated by the issuer. When the user is not enrolled in the authentication program, the user may contact their issuer to be authenticated via another means. For example, the user may be asked by the issuer to provide account details or user details (e.g., mother's maiden name, social security number). When they user is authenticated by the issuer, the access control server computer 110 may receive a notification that the user has been authenticated. In such embodiments, the process may then proceed as in step 512 above.

Figure 6:
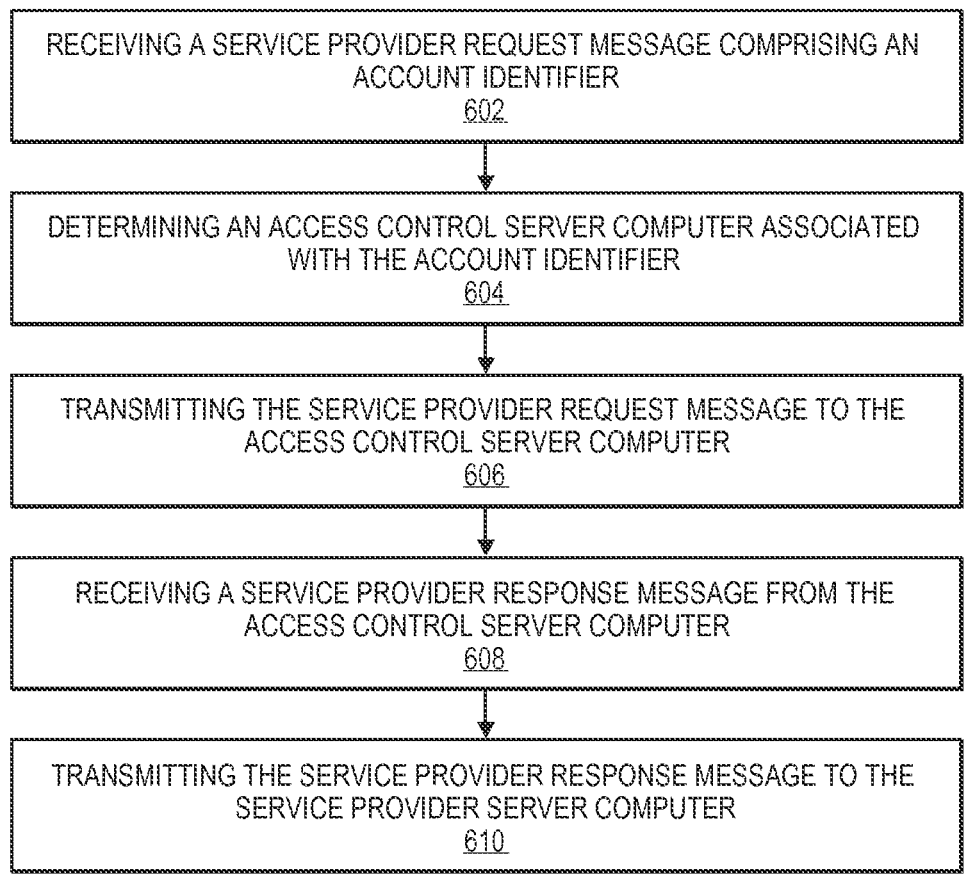
FIG. 6 is a detailed flowchart describing a method of performing an authentication of a user and provisioning an account on a mobile wallet using a secure authentication service according to an embodiment of the present invention.

FIG. 6 is a detailed flowchart describing a method of performing an authentication of a user and provisioning an account on a mobile wallet using a secure authentication service according to an embodiment of the present invention. FIG. 6 describes in additional detail the process performed by the directory server computer 106, as previously described with respect to the FIG. 1.

In step 602, the directory server computer 106 receives a service provider request message comprising an account identifier. The service provider request message may also contain user data identifying the user of the mobile communication device 102, an account identifier, and data on the mobile communication device 102 to allow communication between the mobile communication device 102 and the access control server computer 110. In some embodiments, the service provider request message is a verify enrollment request message that is sent to verify that an account identifier is enrolled in an authentication program. The account identifier may be a credit card number, debit card number, or another account detail provider by the user.

In step 604, the directory server computer 106 determines an access control server computer 110 associated with the account identifier. The message analyzer module 106b-1 in the directory server computer 106 may be configured to review the service provider request message. The message analyzer module 106b-1 may be further configured to identify an account identifier or other type of identifier included in the service provider request message. Upon identifying the account identifier, the message analyzer module 106b-1 may then access a routing tables database 106c. The routing tables database may include one or more routing tables that indicate the appropriate destinations for messages received by the directory server computer 106. For example, the account identifier may be used to locate an appropriate access control server computer 110 that the service provider request message should be transmitted to.

In step 606, the directory server computer 106 transmits the service provider request message to the access control server computer 110. When the directory server computer 106 has the routing data for the appropriate access control server computer 110 associated with the account identifier, the routing module 106b-2 in the directory server computer 106 may be configured to route the service provider request message to the appropriate access control server computer 110.

In step 608, the directory server computer 106 receives a service provider response message from the access control server computer 110. The service provider response message may include the result of the authentication process indicating whether the account identifier was authenticated.

In step 610, the directory server computer 106 transmits the service provider response message to the service provider server computer 104. The service provider server computer 104 may then send the service provider response message to the wallet provider server computer 104. The service provider response message may include the result of the authentication process indicating whether the account identifier was authenticated or not authenticated.

IV. Technical Benefits

Embodiments of the present invention provide a number of technical advantages. For example, by using a secure authentication program that users enroll in for authentication services, embodiments of the present invention provide increased security from fraud by minimizing the risk that an unauthorized individual can successfully be provided with services from a service provider server computer. For example, a user attempting to conduct wallet application management on a mobile communication device (e.g., provisioning accounts or payment devices on to the wallet application) must be authenticated via the authentication process prior to being allowed to make modifications.

An additional benefit of embodiments of the present invention is the ability to use existing infrastructure (e.g., directory servers used for routing transaction-related messages and access control server computers) to conduct authentication services for a user attempting to provision an account or a payment device on to a wallet application. Utilizing existing infrastructure further provides the benefits of conserving resources by using authentication systems for transactions to further provide authentication services for the provision of services to a user.

V. Exemplary Apparatuses

The various participants and elements, such as, e.g., the mobile gateway, described herein with reference to the figures may operate one or more computer apparatuses to facilitate the functions described herein. Any of the elements in the figures, including any servers or databases, may use any suitable number of subsystems to facilitate the functions described herein.

Figure 9:
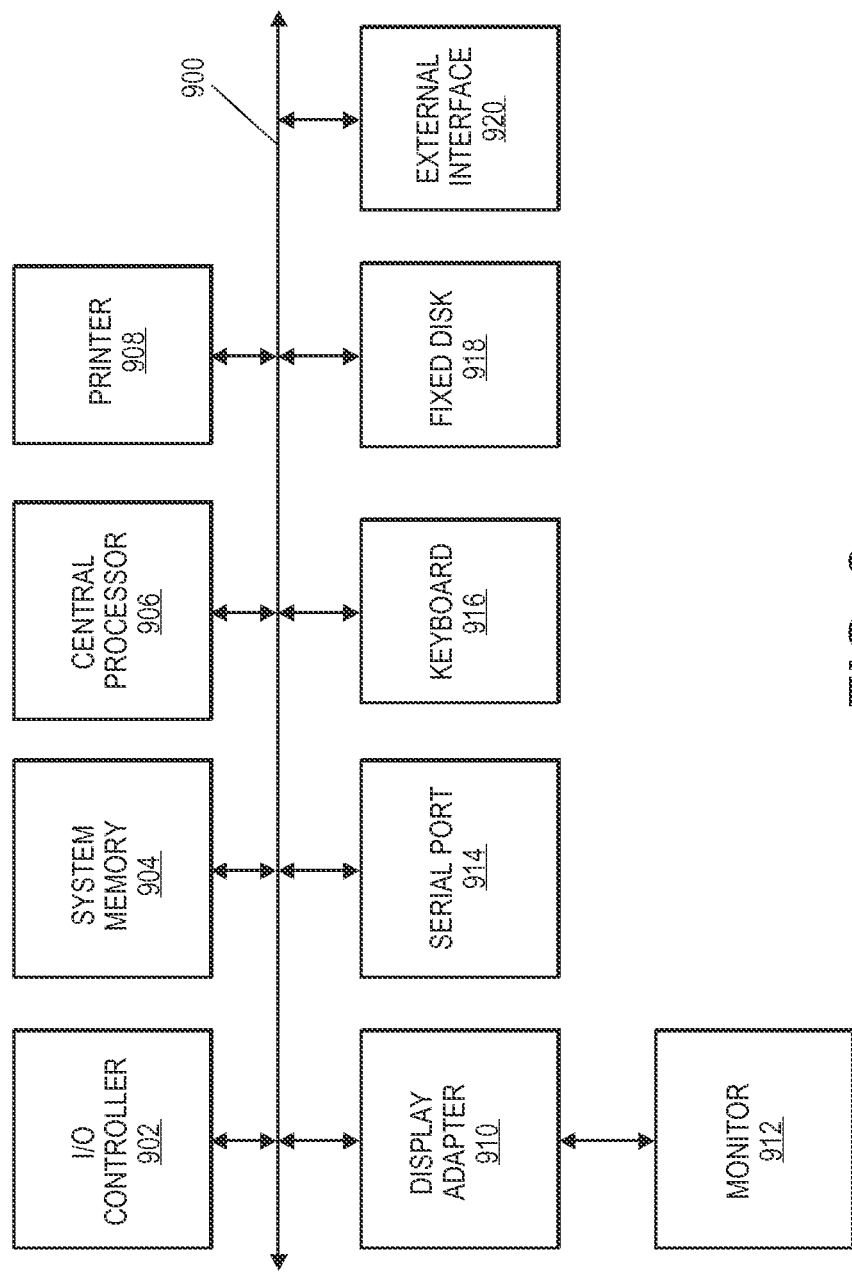
FIG. 9 shows a block diagram of a computer apparatus according to an embodiment of the invention.

Examples of such subsystems or components are shown in FIG. 9. The subsystems shown in FIG. 9 are interconnected via a system bus 900. Additional subsystems such as a printer 908, keyboard 914, fixed disk 916 (or other memory comprising computer readable media), monitor 920, which is coupled to display adapter 910, and others are shown. Peripherals and input/output (I/O) devices, which couple to I/O controller 902 (which can be a processor or other suitable controller), can be connected to the computer system by any number of means known in the art, such as serial port 912. For example, serial port 912 or external interface 918 can be used to connect the computer apparatus to a wide area network such as the Internet, a mouse input device, or a scanner. The interconnection via system bus allows the central processor 906 to communicate with each subsystem and to control the execution of instructions from system memory 904 or the fixed disk 916, as well as the exchange of information between subsystems. The system memory 904 and/or the fixed disk 916 may embody a computer readable medium.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at an access control server computer via a directory server, a service provider request message from a service provider server computer comprising an account identifier;
   determining, by the access control server computer, that the account identifier is enrolled in an authentication program;
   in response to determining that the account identifier is enrolled in the authentication program, transmitting an authentication request message requesting authentication data, to a mobile communication device used by a user associated with the account identifier;
   receiving an authentication response message from the mobile communication device comprising the requested authentication data;
   determining that the requested authentication data in the authentication response message matches authentication data stored in a database; and
   initiating an action relating to the mobile communication device and the account identifier when the requested authentication data in the authentication response message matches the authentication data stored in the database, wherein the action comprises:
      requesting a trusted service manager system to provision the account identifier on to the mobile communication device.

2. The method of claim 1 wherein the service provider request message is a verify enrollment request message.

3. The method of claim 2 wherein the service provider server computer is a wallet provider server computer, and wherein the verify enrollment request message is generated by the wallet provider server computer.

4. The method of claim 1 wherein the access control server computer is an issuer access control server operated by an issuer of the account identifier, and wherein the account identifier is a credit or debit card number.

5. An access control server computer comprising:
   a processor; and
   a non-transitory computer readable medium coupled to the processor, the non-transitory computer readable medium comprising code, executable by the processor for implementing a method comprising:
      a service provider request message from a service provider server computer comprising an account identifier;

determining that the account identifier is enrolled in an authentication program;

in response to determining that the account identifier is enrolled in the authentication program, transmitting an authentication request message requesting authentication data, to a mobile communication device used by a user associated with the account identifier;

receiving an authentication response message from the mobile communication device comprising the requested authentication data;

determining that the requested authentication data in the authentication response message matches authentication data stored in a database; and initiating an action relating to the mobile communication device and the account identifier when the requested authentication data in the authentication response message matches the authentication data stored in the database, wherein the action comprises:

requesting a trusted service manager system to provision the account identifier on to the mobile communication device.

6. The access control server computer of claim 5 wherein the service provider request message is a verify enrollment request message.

7. The access control server computer of claim 6 wherein the service provider server computer is a wallet provider server computer, and wherein the verify enrollment request message is generated by the wallet provider server computer.

8. A system comprising:
the access control server computer of claim 5; and
the service provider server computer in communication with the access control server computer.

9. A method comprising:
receiving, at a directory server, a service provider request message comprising an account identifier from a service provider server computer;
determining, by the directory server, an access control server computer associated with the account identifier;
transmitting the service provider request message to the access control server computer;
receiving, by the directory server, a service provider response message from the access control server computer; and
transmitting the service provider response message to the service provider server computer,
wherein the service provider server computer or the access control server computer initiates an action relating to the account identifier and a mobile communication device used by a user associated with the account identifier when the access control server determines that requested authentication data in an authentication response message matches authentication data stored in a database, the action comprising:
requesting a trusted service manager system to provision the account identifier on to the mobile communication device.

10. The method of claim 9 wherein the service provider request message is a verify enrollment request message.

11. The method of claim 9 further comprising:
determining a risk score associated with the service provider request message and providing the risk score to the access control server computer in the service provider request message.

12. The method of claim 9 wherein the service provider server computer is a wallet provider server computer.

13. A computer comprising:
a processor; and
a non-transitory computer readable medium coupled to the processor, the non-transitory computer readable medium comprising code, executable by the processor for implementing a method comprising:
receiving a service provider request message comprising an account identifier from a service provider server computer;
determining an access control server computer associated with the account identifier;
transmitting the service provider request message to the access control server computer;
receiving, by the directory server, a service provider response message from the access control server computer; and
transmitting the service provider response message to the service provider server computer,
wherein the service provider server computer or the access control server computer initiates an action relating to the account identifier and a mobile communication device used by a user associated with the account identifier when the access control server determines that requested authentication data in an authentication response message matches authentication data stored in a database, the action comprising, the action comprising:
requesting a trusted service manager system to provision the account identifier on to the mobile communication device.

14. The computer of claim 13 wherein the service provider request message is a verify enrollment request message.

15. The computer of claim 13 further comprising:
determining a risk score associated with the service provider request message and providing the risk score to the access control server computer in the service provider request message.

16. A system comprising:
the computer of claim 13;
the access control server computer in communication with the computer; and
the service provider server computer in communication with the access control server computer.

* * * * *